(12) United States Patent
Lin et al.

(10) Patent No.: US 11,285,764 B2
(45) Date of Patent: Mar. 29, 2022

(54) CONTROL VALVE FOR AN AIR MAINTENANCE TIRE

(71) Applicant: The Goodyear Tire & Rubber Company, Akron, OH (US)

(72) Inventors: Cheng-Hsiung Lin, Hudson, OH (US); Robin Lamgaday, Wadsworth, OH (US); Christos Tsionidis, Stuttgart (DE); Frank Herrigel, Mühlacker (DE); Marcus Boertje, Port Washington, NY (US)

(73) Assignee: The Goodyear Tire & Rubber Company, Akron, OH (US)

( * ) Notice: Subject to any disclaimer, the term of this patent is extended or adjusted under 35 U.S.C. 154(b) by 583 days.

(21) Appl. No.: 15/786,889

(22) Filed: Oct. 18, 2017

(65) Prior Publication Data
US 2018/0178599 A1    Jun. 28, 2018

Related U.S. Application Data

(60) Provisional application No. 62/437,938, filed on Dec. 22, 2016.

(51) Int. Cl.
| | | |
|---|---|---|
| *B60C 23/00* | (2006.01) | |
| *B60C 23/12* | (2006.01) | |
| *F16K 15/20* | (2006.01) | |
| *B60C 19/00* | (2006.01) | |

(52) U.S. Cl.
CPC .......... *B60C 23/004* (2013.01); *B60C 23/123* (2020.05); *F16K 15/207* (2013.01); *B60C 2019/008* (2013.01)

(58) Field of Classification Search
CPC . B60C 23/12; B60C 23/004; B60C 2019/008; B60C 29/04; B60C 23/123; F16K 15/207
See application file for complete search history.

(56) References Cited

U.S. PATENT DOCUMENTS

| | | |
|---|---|---|
| 1,050,886 A | 1/1913 | Wetherell |
| 1,134,361 A | 4/1915 | Wetherell |
| 1,682,992 A | 9/1928 | McKone |
| 2,095,489 A | 9/1935 | Cotton |
| 3,304,981 A | 2/1967 | Sheppard |
| 3,833,041 A | 9/1974 | Glad et al. |
| 4,651,792 A | 3/1987 | Taylor |

(Continued)

FOREIGN PATENT DOCUMENTS

| | | |
|---|---|---|
| DE | 3433318 | 3/1986 |
| DE | 3433318 A1 | 3/1986 |

(Continued)

OTHER PUBLICATIONS

European Search Report dated Apr. 16, 2018 for Application Serial No. EP17208486.

*Primary Examiner* — Scott A Browne
(74) *Attorney, Agent, or Firm* — June E. Rickey

(57) ABSTRACT

A control valve suitable for use with a tire and pump assembly is described that controls the flow of air from the pump into the tire. The control valve includes an optional bi-directional feature. The pathways alternatively operate to deliver ambient non-pressurized air to the air pumping tube in response to directional tire rotation against a ground surface.

22 Claims, 9 Drawing Sheets

(56) References Cited

U.S. PATENT DOCUMENTS

| | | |
|---|---|---|
| 4,922,984 A | 5/1990 | Dosjoub et al. |
| 5,052,456 A | 10/1991 | Dosjoub |
| 5,694,969 A | 12/1997 | DeVuyst |
| 5,947,696 A | 9/1999 | Baumgarten |
| 5,975,174 A | 11/1999 | Loewe |
| 6,240,951 B1 | 6/2001 | Yori |
| 6,269,691 B1 | 8/2001 | Sowatzke et al. |
| 6,601,625 B2 | 8/2003 | Rheinhardt |
| 6,659,404 B1 | 12/2003 | Roemke |
| 6,691,754 B1 | 2/2004 | Moore |
| 6,744,356 B2 | 6/2004 | Hamilton et al. |
| 6,772,812 B1 | 8/2004 | Hamilton |
| 6,955,531 B2 | 10/2005 | Wu |
| 7,117,731 B2 | 10/2006 | Hrabal |
| 7,207,365 B2 | 4/2007 | Nelson et al. |
| 7,225,845 B2 | 6/2007 | Ellmann |
| 7,314,072 B2 | 1/2008 | Bunker |
| 7,322,392 B2 | 1/2008 | Hawes |
| 7,408,453 B2 | 8/2008 | Breed |
| 7,530,379 B1 | 5/2009 | Becker et al. |
| 7,637,279 B2 | 12/2009 | Amley et al. |
| 7,726,330 B2 | 6/2010 | Schuster |
| 7,760,079 B2 | 7/2010 | Isono |
| 7,909,076 B2 | 3/2011 | Wilson |
| 7,911,332 B2 | 3/2011 | Caretta et al. |
| 7,926,530 B2 | 4/2011 | Isono |
| 8,042,586 B2 | 10/2011 | Losey et al. |
| 8,052,400 B2 | 11/2011 | Isono |
| 8,113,254 B2 | 2/2012 | Benedict |
| 8,132,607 B2 | 3/2012 | Kusunoki et al. |
| 8,136,561 B2 | 3/2012 | Sandoni et al. |
| 8,235,081 B2 | 8/2012 | Delgado et al. |
| 8,245,746 B2 | 8/2012 | Stanczak |
| 8,267,666 B2 | 9/2012 | Gruber et al. |
| 8,291,950 B2 | 10/2012 | Hinque et al. |
| 8,322,036 B2 | 12/2012 | Delgado et al. |
| 8,356,620 B2 | 1/2013 | Colussi et al. |
| 8,381,784 B2 | 2/2013 | Delgado |
| 8,381,785 B2 | 2/2013 | Losey |
| 8,435,012 B2 | 5/2013 | Clinciu |
| 8,464,580 B2 | 6/2013 | Paul |
| 8,528,611 B2 | 9/2013 | Wilson et al. |
| 8,534,335 B2 | 9/2013 | Benedict |
| 8,550,137 B2 | 10/2013 | Delgado et al. |
| 8,573,270 B2 | 11/2013 | Hinque |
| 8,656,972 B2 | 2/2014 | Hinque et al. |
| 8,662,127 B2 | 3/2014 | Hinque et al. |
| 8,695,661 B2 | 4/2014 | Delgado et al. |
| 8,701,726 B2 | 4/2014 | Hinque |
| 8,746,306 B2 | 6/2014 | Hinque et al. |
| 8,763,661 B2 | 7/2014 | Richardson |
| 8,807,182 B2 | 8/2014 | Kelly |
| 8,820,369 B2 | 9/2014 | Hinque et al. |
| 8,820,376 B2 | 9/2014 | Bormann |
| 8,826,955 B2 | 9/2014 | Delgado et al. |
| 8,851,132 B2 | 10/2014 | Delgado et al. |
| 8,857,484 B2 | 10/2014 | Hinque |
| 8,919,402 B2 | 12/2014 | Hansen |
| 8,944,126 B2 | 2/2015 | Frantzen |
| 8,955,567 B2 | 2/2015 | Hinque et al. |
| 8,960,249 B2 | 2/2015 | Lin |
| 8,973,633 B2 | 3/2015 | Wilson et al. |
| 8,985,171 B2 | 3/2015 | Hinque et al. |
| 8,991,456 B2 * | 3/2015 | Gobinath ............... B60C 23/12 152/426 |
| 9,039,092 B1 | 5/2015 | Krankkala et al. |
| 9,039,386 B2 | 5/2015 | Richardson et al. |
| 9,045,005 B2 | 6/2015 | Gobinath et al. |
| 9,061,556 B2 | 6/2015 | Hinque |
| 9,104,209 B2 | 8/2015 | Colussi et al. |
| 9,114,674 B2 | 8/2015 | Hall |
| 9,126,462 B2 | 9/2015 | Hinque |
| 9,205,714 B2 | 12/2015 | Hinque |
| 9,216,619 B2 | 12/2015 | Lin |
| 9,216,620 B2 | 12/2015 | Lamgaday et al. |
| 9,233,582 B2 | 1/2016 | Hinque et al. |
| 9,238,388 B2 | 1/2016 | Fletcher et al. |
| 9,242,518 B2 | 1/2016 | Hinque |
| 9,259,981 B2 | 2/2016 | Durr |
| 9,272,586 B2 | 3/2016 | Durr |
| 9,278,584 B2 | 3/2016 | Bushnell et al. |
| 9,302,556 B2 | 4/2016 | Cuny et al. |
| 9,308,784 B2 | 4/2016 | Hinque |
| 9,308,787 B2 | 4/2016 | Hinque |
| 9,308,788 B2 | 4/2016 | Fazekas |
| 9,327,560 B2 | 5/2016 | Hinque |
| 9,327,561 B2 | 5/2016 | Hinque |
| 9,333,816 B2 | 5/2016 | Durr |
| 9,340,077 B2 | 5/2016 | Hinque et al. |
| 9,365,084 B2 | 6/2016 | Hinque |
| 9,381,780 B2 | 7/2016 | Hinque |
| 9,409,450 B2 | 8/2016 | Dean et al. |
| 9,415,640 B2 | 8/2016 | Lin |
| 9,429,243 B2 | 8/2016 | Hessling et al. |
| 9,533,534 B2 | 1/2017 | Lamgaday |
| 9,539,869 B2 | 1/2017 | Hinque et al. |
| 9,555,672 B2 | 1/2017 | Bernhardt et al. |
| 9,783,015 B2 | 10/2017 | Lin |
| 9,796,224 B2 | 10/2017 | Lamgaday et al. |
| 2002/0124925 A1 | 9/2002 | Caretta et al. |
| 2004/0112495 A1 | 6/2004 | Weise |
| 2004/0173296 A1 | 9/2004 | White et al. |
| 2004/0202546 A1 | 10/2004 | Kayukawa et al. |
| 2005/0279439 A1 | 12/2005 | Wessman |
| 2006/0201598 A1 | 9/2006 | Rheinhardt et al. |
| 2007/0240803 A1 | 10/2007 | Marin-Martinod |
| 2008/0308206 A1 | 12/2008 | Okada |
| 2009/0107602 A1 | 4/2009 | Kabakov |
| 2009/0294006 A1 | 12/2009 | Hrabal |
| 2010/0243121 A1 | 9/2010 | Eigenbrode |
| 2010/0300591 A1 | 12/2010 | Rheinhardt |
| 2011/0120611 A1 * | 5/2011 | Hansen ............... B60C 23/12 152/429 |
| 2011/0146868 A1 | 6/2011 | Losey et al. |
| 2012/0234447 A1 | 9/2012 | Narloch et al. |
| 2012/0305126 A1 | 12/2012 | Merrill |
| 2013/0306192 A1 | 11/2013 | Hennig |
| 2014/0000778 A1 | 1/2014 | Gobinath |
| 2014/0020805 A1 | 1/2014 | Gobinath et al. |
| 2014/0110030 A1 | 4/2014 | Krempel |
| 2014/0130895 A1 | 5/2014 | Hinque et al. |
| 2014/0150945 A1 | 6/2014 | Kumar et al. |
| 2014/0158267 A1 | 6/2014 | Gobinath |
| 2014/0166118 A1 | 6/2014 | Stephens |
| 2014/0261942 A1 | 9/2014 | Fletcher et al. |
| 2014/0271261 A1 | 9/2014 | Boelryk |
| 2015/0090386 A1 | 4/2015 | Lin et al. |
| 2015/0096657 A1 | 4/2015 | Bennett et al. |
| 2015/0122389 A1 | 5/2015 | Durr |
| 2015/0122390 A1 * | 5/2015 | Durr ............... B60C 23/12 152/450 |
| 2015/0137420 A1 | 5/2015 | Hinque et al. |
| 2015/0147198 A1 | 5/2015 | Chawla et al. |
| 2015/0147199 A1 | 5/2015 | Chawla et al. |
| 2015/0147201 A1 | 5/2015 | Griffoin |
| 2015/0165840 A1 | 6/2015 | Hinque |
| 2015/0165841 A1 | 6/2015 | Hinque |
| 2015/0174973 A1 | 6/2015 | Hinque et al. |
| 2015/0231937 A1 | 8/2015 | Holdrich et al. |
| 2015/0268669 A1 | 9/2015 | Vogt et al. |
| 2015/0314657 A1 | 11/2015 | Lin |
| 2015/0375575 A1 | 12/2015 | Benedict et al. |
| 2015/0375577 A1 | 12/2015 | Serbu et al. |
| 2016/0046157 A1 | 2/2016 | Lin |
| 2016/0082788 A1 | 3/2016 | Matlow |
| 2016/0176243 A1 | 6/2016 | Lin |
| 2016/0243776 A1 | 8/2016 | Michel |
| 2016/0327178 A1 | 11/2016 | Hessling et al. |
| 2016/0332486 A1 | 11/2016 | Strashny et al. |
| 2017/0015148 A1 | 1/2017 | Serret Avila et al. |
| 2017/0015157 A1 | 1/2017 | McClellan |
| 2017/0015159 A1 | 1/2017 | Richardson |

(56) References Cited

U.S. PATENT DOCUMENTS

2017/0144492 A1   5/2017  Lamgaday
2017/0144493 A1   5/2017  Lamgaday et al.

FOREIGN PATENT DOCUMENTS

| | | | |
|---|---|---|---|
| DE | 4323835 A1 | 1/1995 | |
| EP | 2985158 A1 * | 2/2016 | ........... B60C 23/123 |
| FR | 2568345 | 1/1986 | |
| RU | 2106978 | 3/1998 | |
| SE | 183890 | 5/1963 | |
| WO | 2003049958 | 6/2003 | |
| WO | 2005012009 A1 | 7/2004 | |
| WO | 2007134556 | 11/2007 | |
| WO | 2010008338 | 1/2010 | |
| WO | WO2014117157 A1 | 7/2014 | |
| WO | WO2014149754 A1 | 9/2014 | |
| WO | 2015014904 | 2/2015 | |
| WO | 2015104528 | 7/2015 | |
| WO | 2015105848 A2 | 7/2015 | |
| WO | 2015112109 | 7/2015 | |
| WO | WO2014182979 A4 | 7/2015 | |
| WO | 2015114153 A1 | 8/2015 | |
| WO | 2016009342 | 1/2016 | |
| WO | 2015193838 A1 | 3/2016 | |
| WO | 2016189273 A | 12/2016 | |
| WO | 2017011692 A | 1/2017 | |

* cited by examiner

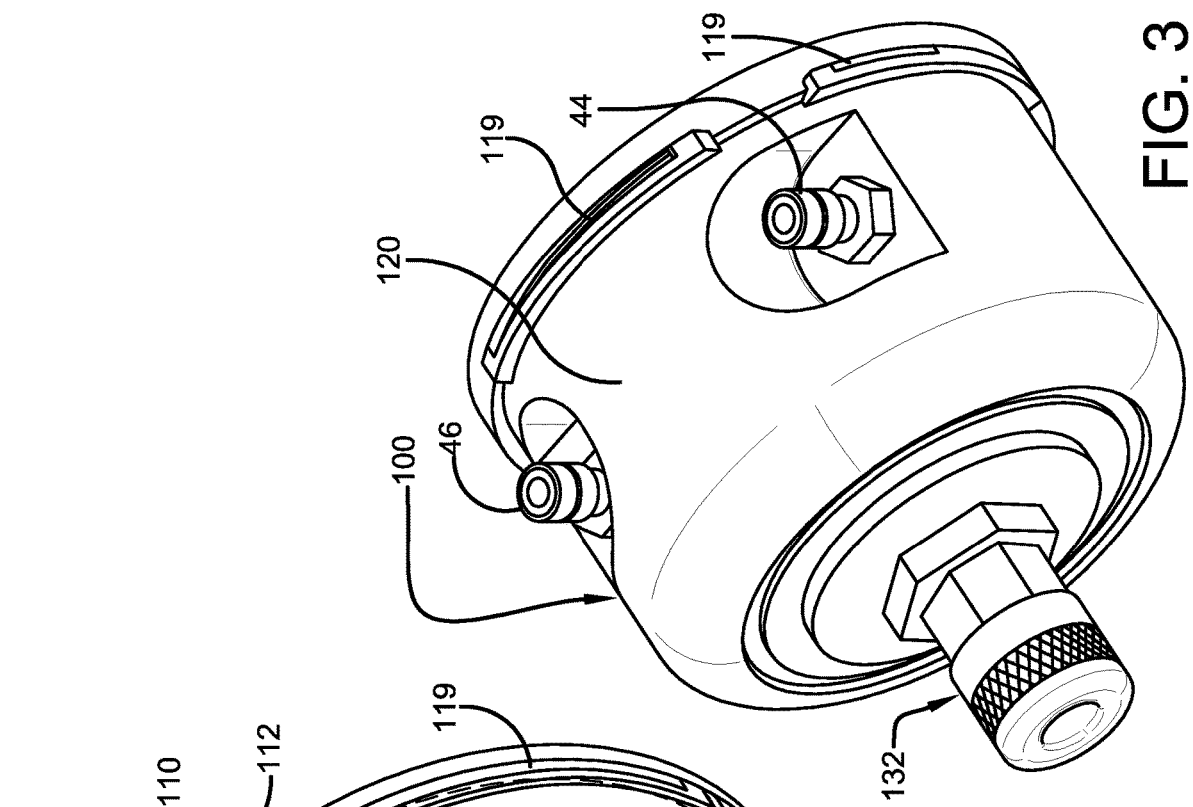
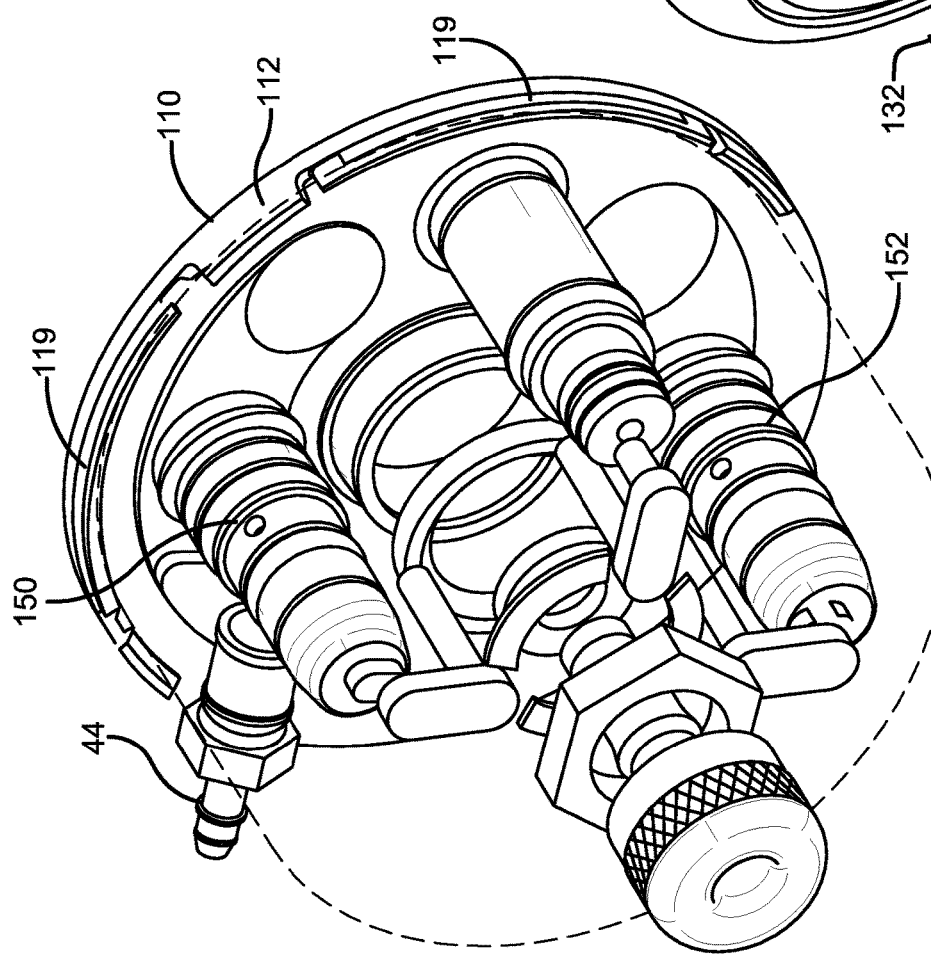

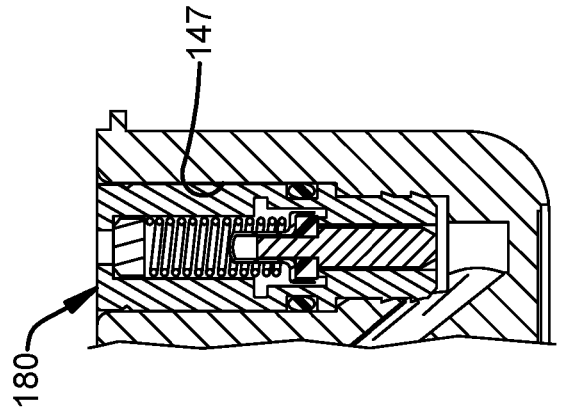
FIG. 8
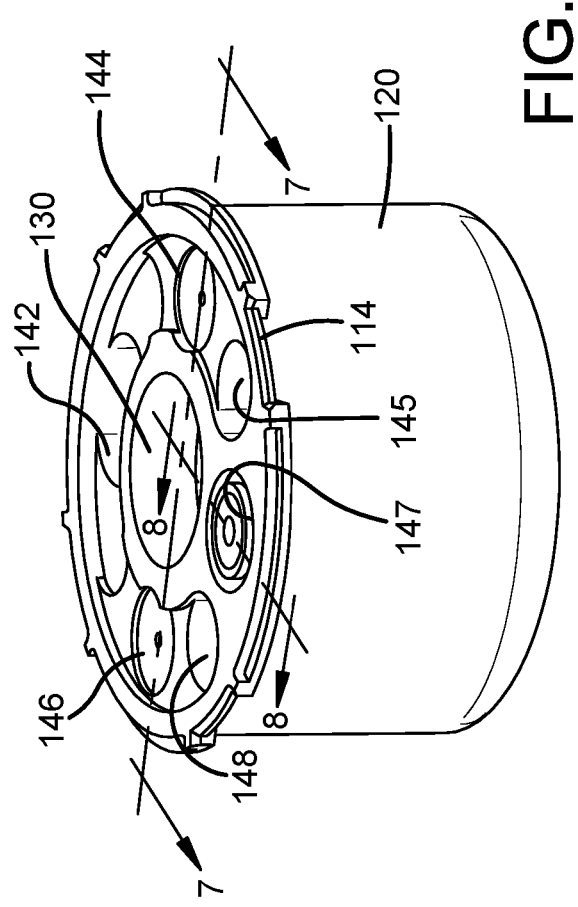
FIG. 6
FIG. 7

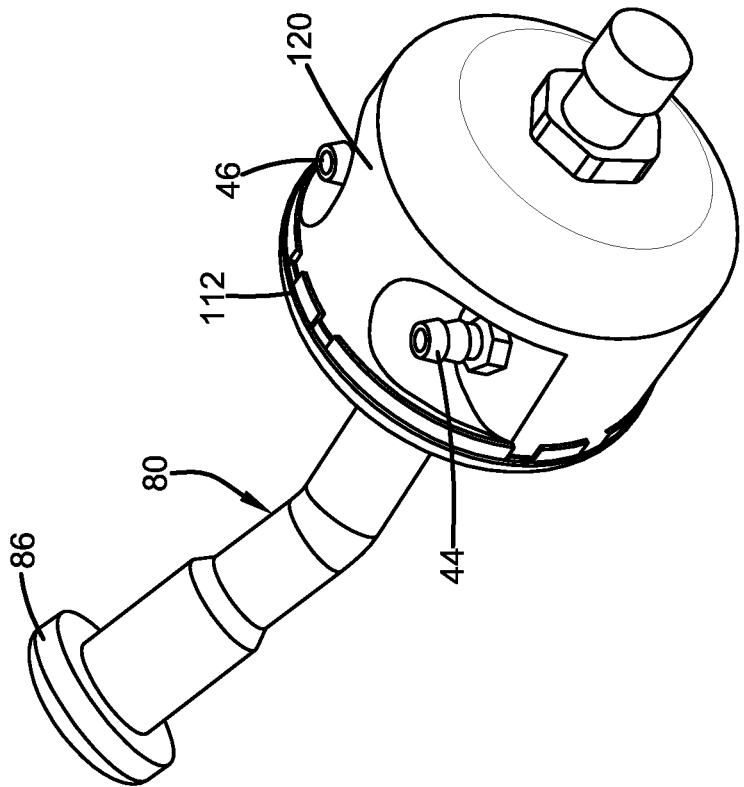
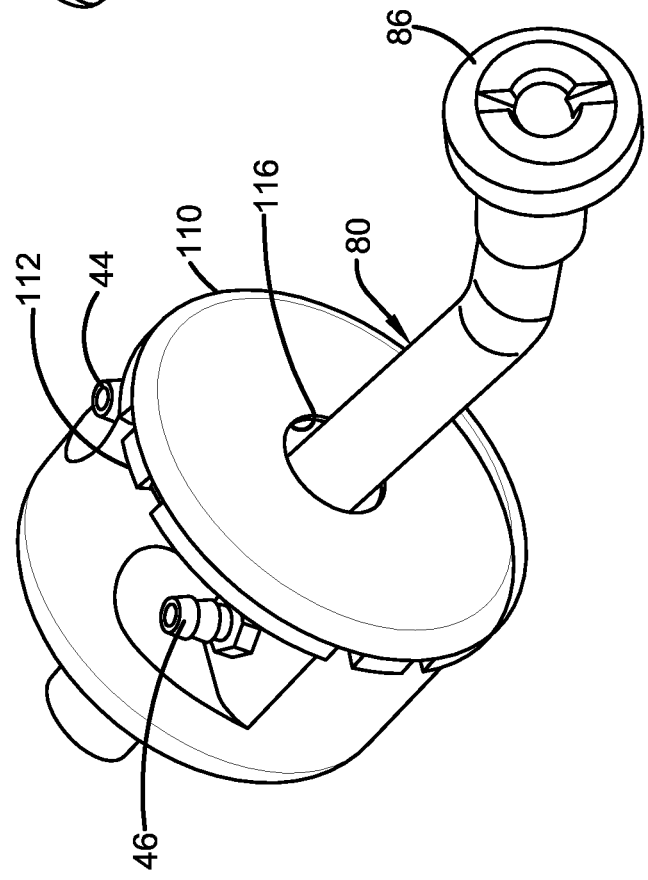
FIG. 9B
FIG. 9A

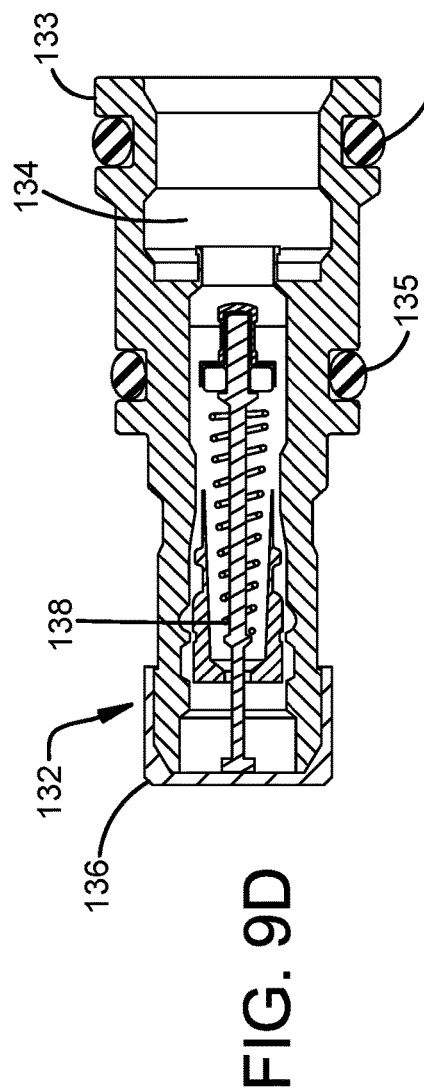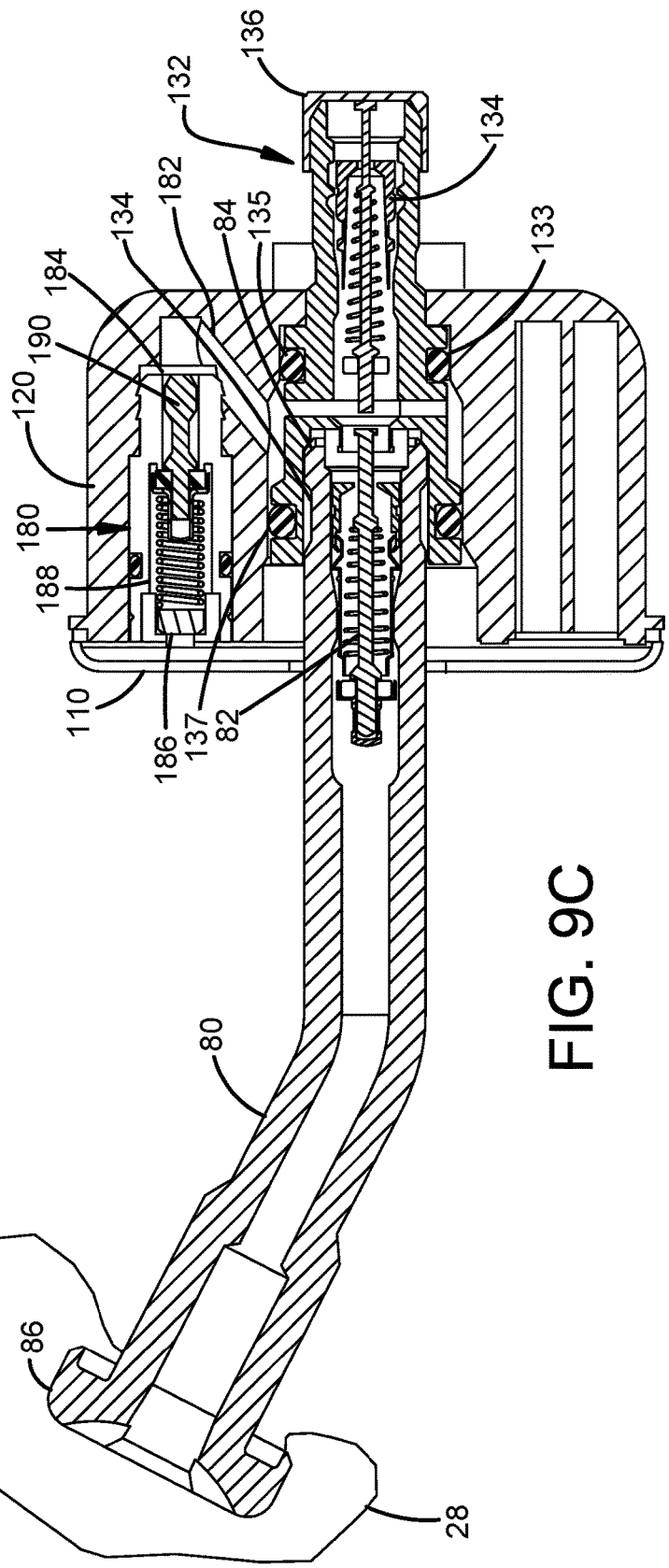

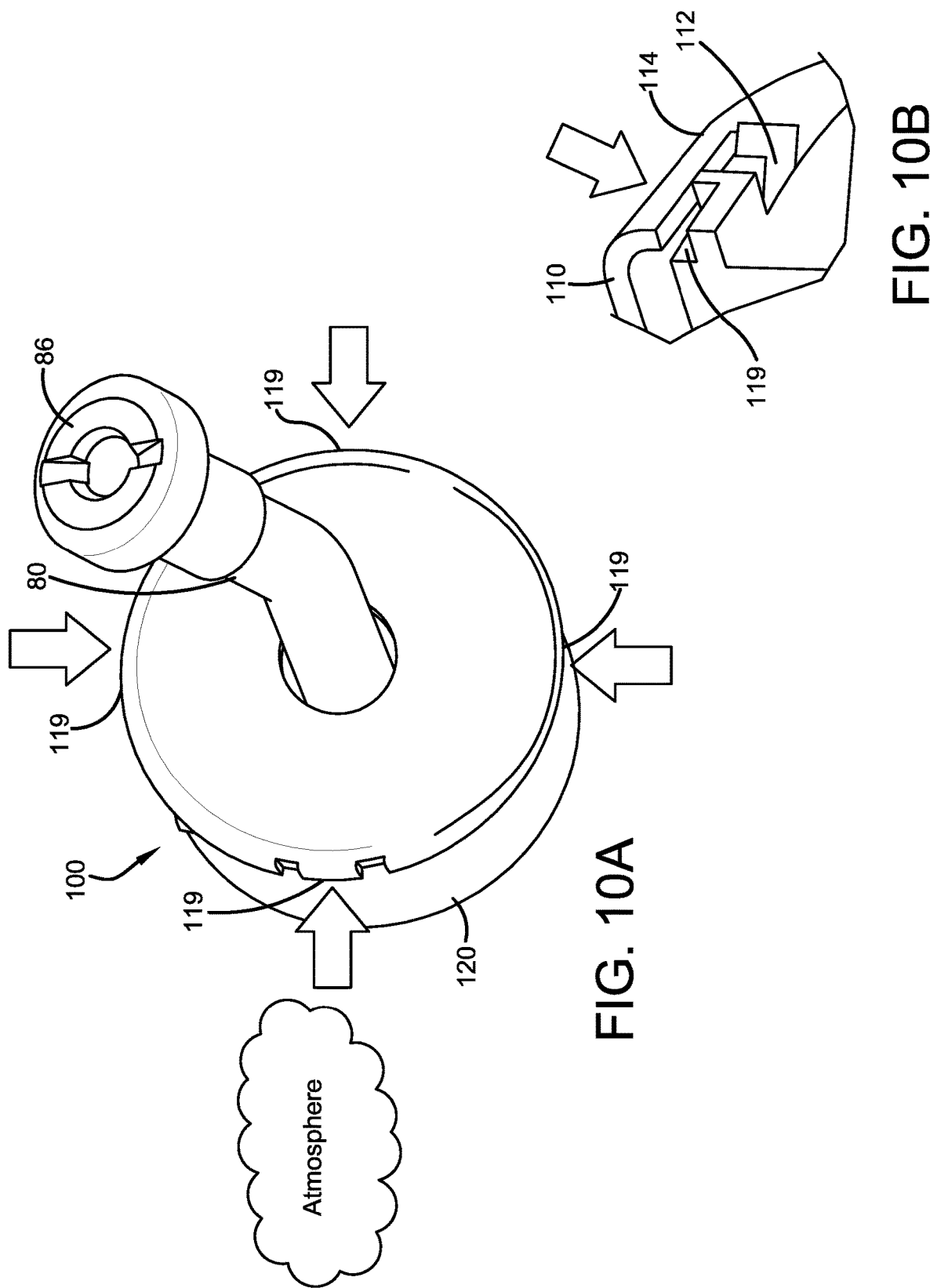

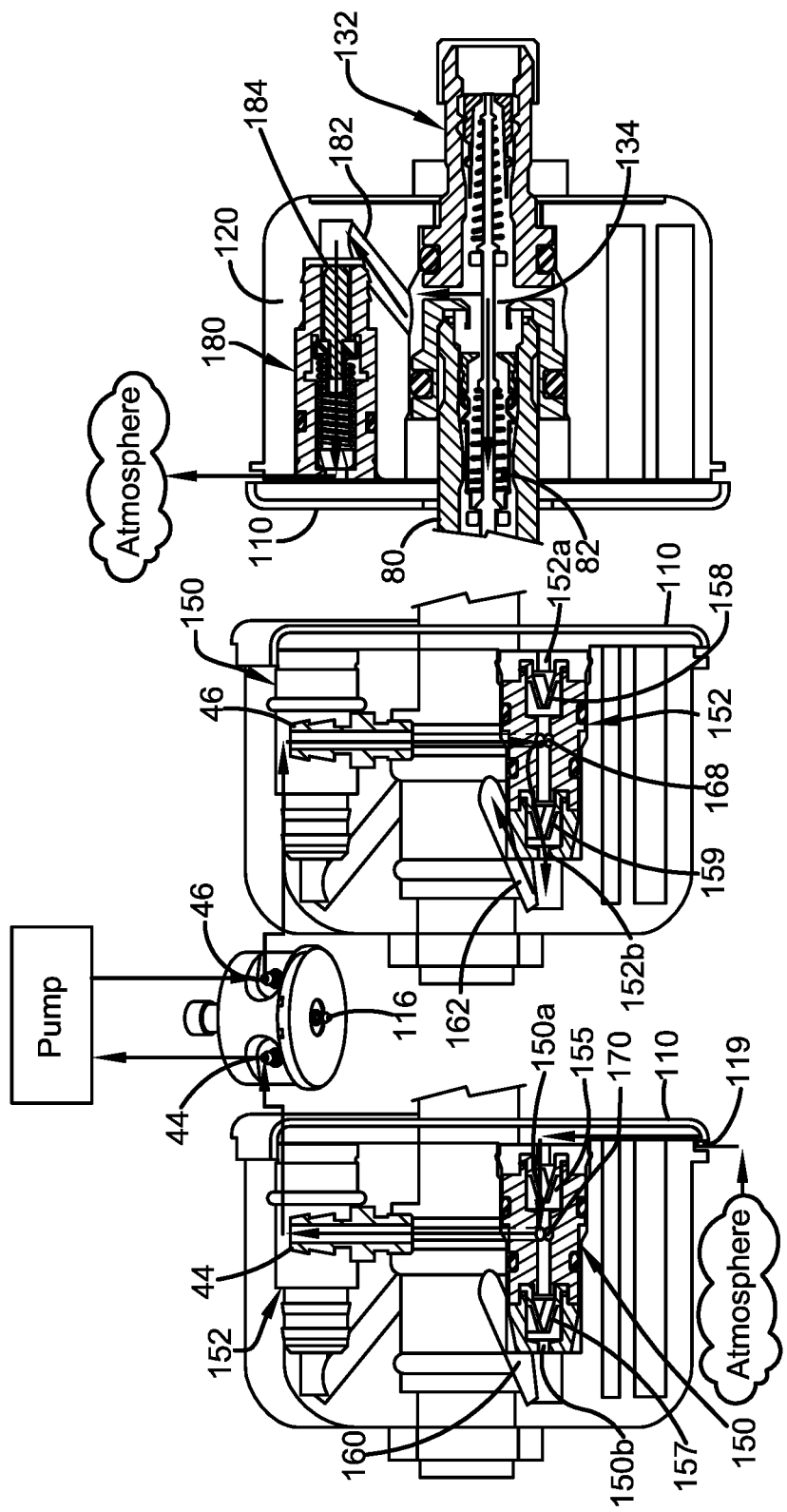

CONTROL VALVE FOR AN AIR MAINTENANCE TIRE

FIELD OF THE INVENTION

The invention relates generally to valves for tires, and more particularly to a control valve for an air maintenance tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

According to an aspect of the invention, a control valve assembly mounts to a tire valve stem and operably controls a flow of pressurized air through the tire valve stem from either an external pressurized air source or a wheel or tire mounted pressurized air source. The tire mounted pressurized air source may be a peristaltic pump preferably built into the tire sidewall. The wheel mounted pressurized air source may comprise a wheel mounted pump. The control valve assembly optionally includes a bi-directional feature so that if a peristaltic pump is used, the tire may rotate in either direction and pump air into the valve stem.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Duck Valve" is a check valve manufactured from rubber or synthetic elastomer, and shaped like the beak of a duck. One end of the valve is stretched over the outlet of a supply line, conforming itself to the shape of the line. The other end, the duckbill, retains its natural flattened shape. When pressurized air is pumped from the supply line through the duckbill, the flattened end opens to permit the pressurized air to pass. When pressure is removed, the duckbill end returns to its flattened shape, preventing backflow.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Inward" directionally means toward the tire cavity.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Outward" directionally means in a direction away from the tire cavity.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 3 is a perspective rear view of the control valve of the present invention.

FIG. 4 is a perspective rear view of the control valve of the present invention shown with the component parts.

FIG. 6 is a front view of the housing of the control valve with the check valve modules mounted therein.

FIG. 7 is a cross-sectional view of FIG. 6 in the direction 7-7.

FIG. 8 is a cross-sectional view of FIG. 6 in the direction 8-8.

FIG. 9A is a perspective front view of the control valve mounted on a tire valve (tire omitted for clarity);

FIG. 9B is a perspective rear view of the control valve mounted on a tire valve (tire omitted for clarity)

FIG. 9C is a cross-sectional side view of the control valve mounted to a tire valve (tire omitted for clarity)

FIG. 9D is a cross-sectional view of the manual fill assembly and main pressure chamber;

FIG. 10A is a front view of the control valve mounted to a tire valve showing the air inlet ports.

FIG. 10B is a close up view of the cover and housing interface showing the air inlet ports.

FIG. 11A is a side cross-sectional view of the control valve showing the air pathway from the inlet to the pump inlet.

FIGS. 11B and 11C are side cross-sectional views of the control valve showing the air pathway from the pump outlet through the control valve and into the tire.

DETAILED DESCRIPTION OF THE INVENTION

Figure 1A:
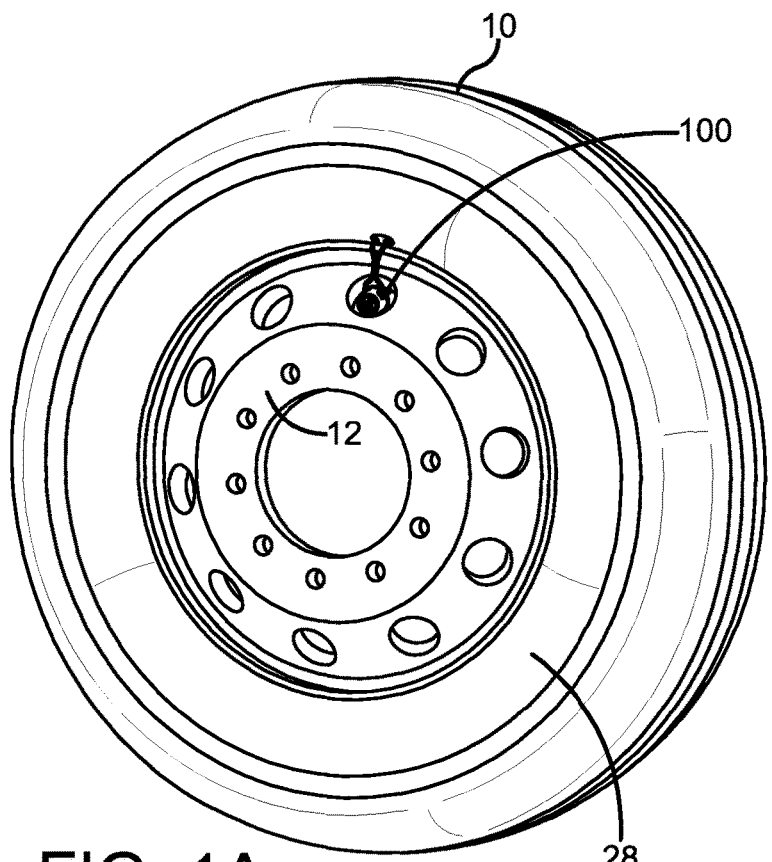
FIG. 1A is a perspective view of a tire with a control valve of the present invention mounted on a tire valve stem.
Figure 1B:
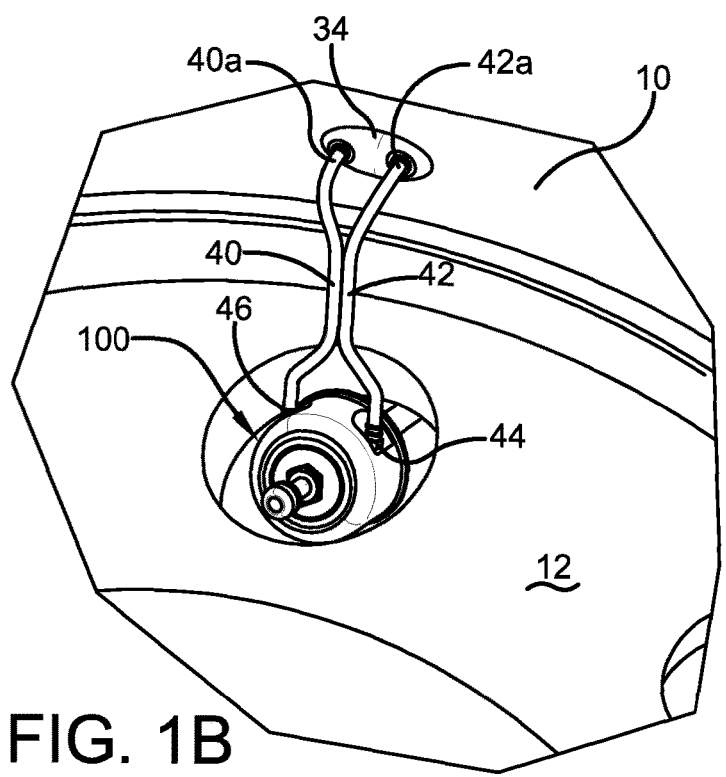
FIG.1B is a close up view of the control valve of FIG. 1A.

Referring to FIG. 1, a control valve assembly 100 of the present invention is shown mounted to a valve stem 80 of a tire 10. The tire 10 is mounted on a tire rim body 12. The tire may include an internal peristaltic pump 15 which may be mounted in the tire sidewall. The peristaltic pump 15 may preferably be annular or 360-degree pump so that the inlet end of the pump is several inches from the outlet end of the pump assembly. The tire and rim body enclose a tire cavity 28. The tire includes a conventional valve stem 80 for pumping air into the tire cavity 28. The conventional valve stem 80 has a distal end 84 having an internal valve core 82 such as a presta valve core or a shrader valve core. The tire valve stem has a second end 86 that is positioned in the tire cavity so that fluid may be communicated from the distal end 84 of the valve stem through the tire valve core 84 and into the cavity.

The peristaltic pump 15 may comprise a molded annular passageway or an annular air tube that is inserted into an annular passageway. The tube is formed of a resilient, flexible material such as plastic or rubber compounds that are capable of withstanding repeated deformation cycles. So, constructed, the tube may deform within a tire into a flattened condition subject to external force and, upon removal of such force, return to an original sectional configuration. In the embodiment shown, the cross-section of the tube in an unstressed state is generally circular but other alternative tube geometries may be employed if desired. The tube is of a diameter sufficient to operatively pass a requisite volume of air sufficient for the purpose of pumping air into the tire cavity 28 to maintain the tire 10 at a preferred inflation pressure.

The peristaltic principles of incorporating a deformable air tube within a tire are shown and described in U.S. Pat. No. 8,113,254, incorporated herein by reference in its entirety. In the patented system, the tube is incorporated within an annular tire passageway formed within the tire proximate a tire bead region. As the tire rotates air from outside the tire is admitted into the tube and pumped along the air tube by the progressive squeezing of the tube within the tire as the tire rotates. Air is thus forced into an outlet valve and therefrom into the tire cavity to maintain air pressure within the tire cavity at a desired pressure level.

Figure 2:
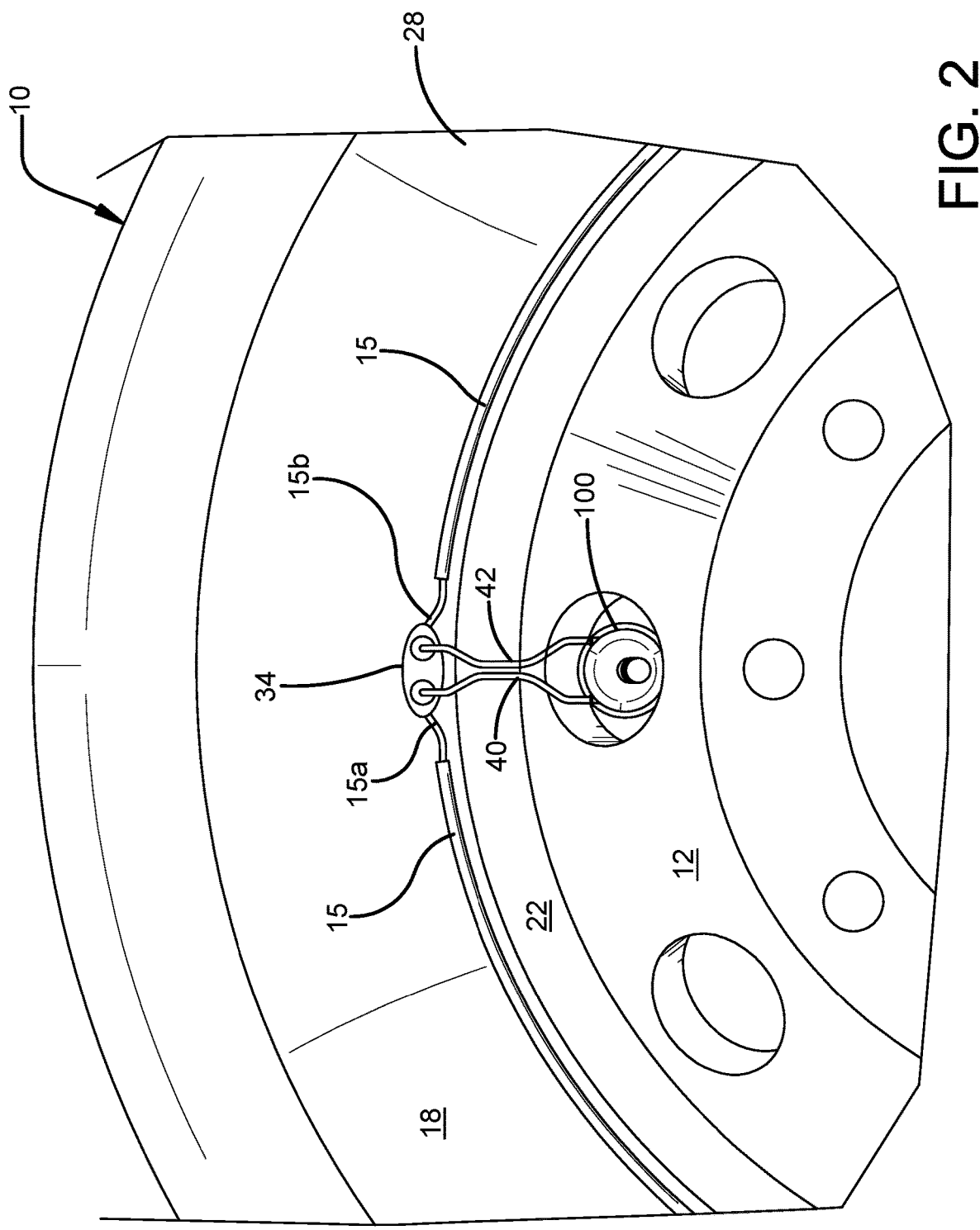
FIG. 2 is a partial view of the tire shown with the control valve connected to a pump mounted in the tire (and shown in phantom).
Figure 5:
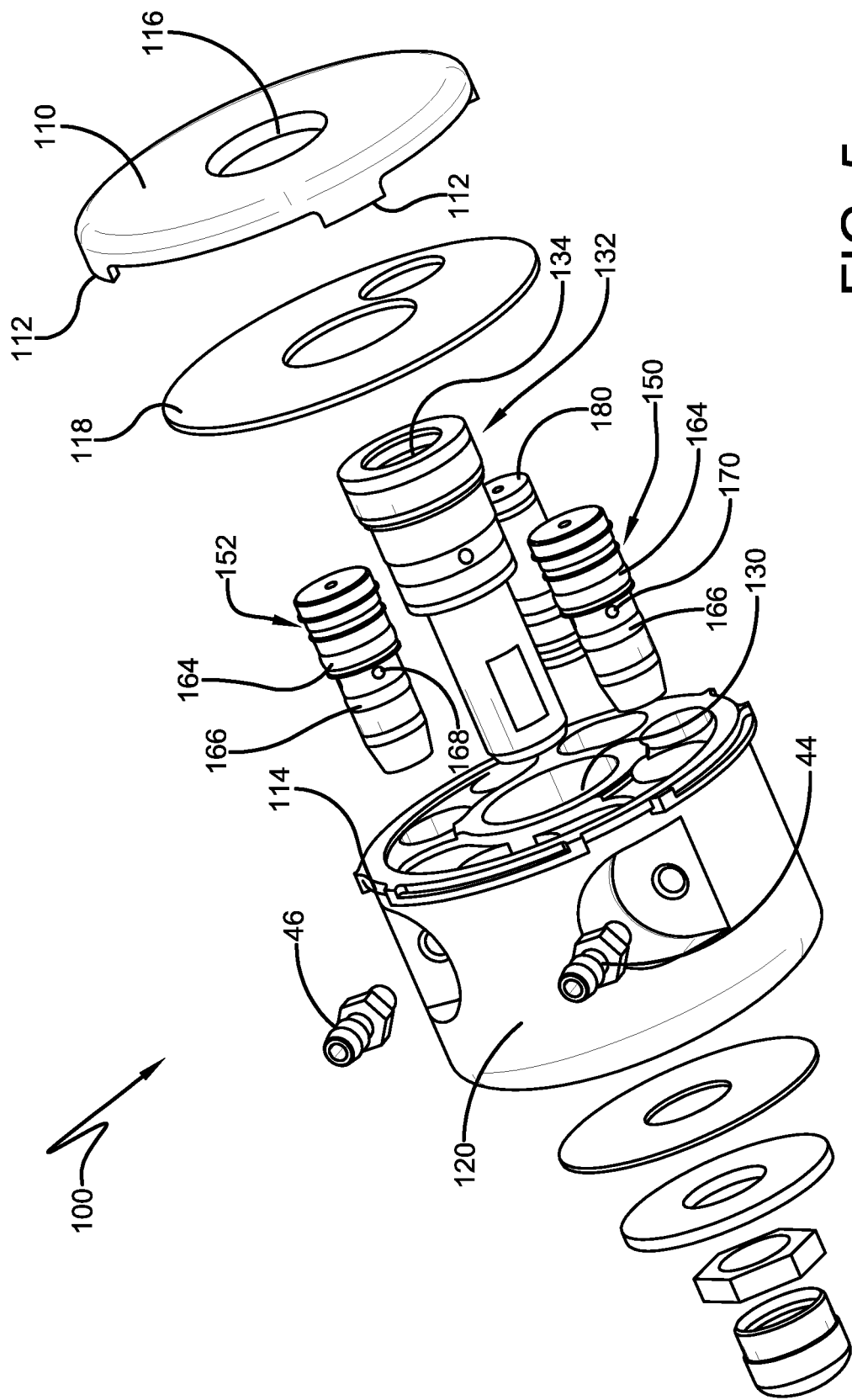
FIG. 5 is an exploded view of the control valve of the present invention.

As partially shown in FIG. 2, the pump 15 is preferably annular and is preferably located in the tire sidewall 18 region proximate to a bead region 22. However, other configurations for the air tube may be devised without departing from the invention. Opposite ends 15a,15b of the pump connect into an inline connector block 34. Conduits 40, 42 each have a first end 40a,42a coupled to the connector block 34, wherein each first end is connected to a respective end of the pumping tube 15a,15b. A second end 40b,42b of each conduit 40,42 is connected to the control valve ports 44,46. Conduits 40 and 42 represent air channels to and from the pump 15. In the pumping mode, forward revolution of the tire, one conduit delivers air to the pumping tube and the other conduit conducts air pressurized by the pumping tube to the bi-directional block 40. In the reverse rotational direction of the tire, the conduits 40,42 functionally reverse.

A first embodiment of the control valve 100 is shown in FIGS. 3-10. As shown in FIG. 3, the control valve 100 has a removable cap 110 that has detents 112 on the outer rim surface that snap onto aligned edges 114 of a valve body 120. The cap has a central hole 116 for receiving a distal end 84 of the tire valve stem 80. Positioned underneath the cap 110 is a filter 118 for filtering the inlet ambient air that enters the control valve 100 from inlet passageways 119 located between the valve body rim and the cap outer rim.

The valve body 120 is preferably round and compact, and has a central bore 130 for receiving a main pressure module 132. As shown in FIG. 9D, the main pressure module 132 has a first end 133 housing an internal main pressure chamber 134, and a second end 136 having an optional valve core 138 positioned therein, preferably a schrader valve core. The second end 136 is useful for connection to an external pressure source so that the system may be manually filled by a user. FIG. 9c illustrates the distal end 84 of the valve stem 80 positioned in the main pressure chamber 134. The main pressure module 132 has sealing gaskets 135,137 to maintain a fluid tight seal. Auxiliary pressurized air from an external pump source may be connected to the distal end 136 to manually inflate the tire cavity 28 through the valve stem 80 to the desired pressure.

The valve body 120 has a plurality of chambers 142,144, 145, 146, 147, 148 that are preferably concentrically located about the main pressure chamber 134 Chambers 142,145 and 148 remain empty and are optional fluid reservoirs. Chambers 144,146 preferably each have a check valve module 150,152 inserted therein. Each check valve module 150,152 has a central passageway 154,156 in fluid communication with an inlet end 150a,152a and an outlet end 150b,152b. Preferably, each passageway 154,156 are parallel to each other and are straight with no bends. Positioned within each central passageway 154,156 is at least one check valve 155,159. For bidirectional feature, such that the tire can be pumped in either rotational direction, there are preferably two check valves 155,157, and 158,159 mounted in series in a respective module. The four check valves are all oriented in the same direction, so that the flow travels from the inlet to the outlet without reversing. The check valves 155,157,158,159 are preferably duck bill type check valves and are oriented to allow flow from the inlet end to the outlet end, and to prevent backflow in the direction from the outlet to the inlet.

Each check valve module 150,152 has first and second seals 164,166. One of the check valve modules functions as a pump inlet chamber, while the other chamber functions as a pump outlet chamber. If the valve is connected to a peristaltic pump, the direction of the tire rotation determines which check valve module functions as a pump inlet chamber and pump outlet chamber. Located between the first and second seals 164,166 is an outlet port 168,170 that is in fluid communication with a respective passageway 154,156. Each outlet port 168,170 is preferably located between the first and second set of check valves as shown in FIG. 7. Outlet port 168 is in fluid communication with port 46, while outlet port 170 is in fluid communication with port 44.

Each outlet end 150b,152b of each check valve module 150,152 is connected in fluid communication with angled passageways 160,162 respectively. The angled passageways 160,162 are in fluid communication with the main pressure chamber 134. The main pressure chamber 134 is in fluid communication with the inlet end of a relief valve 180, the inlet end of the tire valve stem 80, and the outlet ends 159b,152b of each check valve module.

The relief valve 180 is positioned in chamber 147 of control valve 100. The relief valve is designed to prevent over inflation of the tire cavity. The inlet 184 to the relief valve 180 is in fluid communication with the main pressure chamber 134 via conduit 182. The outlet 186 to the relief valve 180 is in fluid communication with the ambient atmosphere. The relief valve has a spring 188 that biases the valve core 190 in the closed position. When the inlet pressure to the relief valve exceeds the desired set pressure exerted on the plunger 190, the valve seat 192 unseats allowing the pressurized air to vent through the relief valve body and out through the exit holes 186.

In this embodiment, the outlet pressurized air from the pumping tube is controlled by the spring regulated relief valve 180. If the tire cavity pressure is less than the set pressure, the tire valve 82 opens, allowing air into the tire cavity. If the tire cavity pressure is higher than the set pressure, the pumped air will release through the relief valve into the atmosphere. The set pressure is determined by selecting a spring of the relief valve that actuates at the desired set pressure. The spring of the tire valve stem 82 is selected to have a lower cracking pressure so that the when the main chamber pressure is below the relief valve set pressure and the pressure difference between the pressurized air and tire cavity is higher than the cracking pressure, the tire cavity will be pumped with pressurized air until the relief valve set pressure is reached.

An adjustable relief valve may be substituted for the fixed relief valve 180 shown herein. The adjustable relief valve has a screw adjustment that allows the set pressure to be easily adjusted.

System Operation

The operation of the system is shown in FIGS. 11A-11C. As shown in FIGS. 10A &B, outside ambient air is sucked into the system through the inlet passageways 119 located at the interface of the outer cap rim and the valve body 120. The ambient air passes through the filter 118 and then through check valve 155 of the first check valve module 150. The air exits the check valve module 150 through port 170, through valve body port 44 and then into the inlet of the peristaltic pump 15a. As the tire rotates, the air is compressed in the peristaltic pump and exits the pump chamber to pump outlet 15b. The compressed air enters the control valve through port 46. As shown in FIG. 11b, the compressed air travels through the second check valve module 152 through port 168. The compressed air exits the second check valve module through check valve 159 and out through outlet 152b and into angled passageway 162 of the valve body and into the main pressure chamber 134 of the control valve 100. If the pressure of the main pressure chamber is greater than the cracking pressure of the tire valve 82 and less than the relief set pressure, then the pressurized air will enter the tire cavity through the valve stem 80 of the tire. If the pressure of the main pressure chamber is less than the cracking pressure of the tire valve 82, then the tire valve 82 will remain closed. If the pressure of the main pressure chamber exceeds the ceiling set pressure of the relief valve 180, the relief valve will open and the compressed air will exit into the ambient air.

The control valve can operate bi-directionally, so that if the tire rotates in the opposite direction, the system will pump without any changes being made to the system. The bi-directionality in pumping air from the pump is made possible by the dual air flow paths 154,156, wherein each flow path preferably is straight with no bends. The bi-directional feature is useful when the pump is located in the tire, so that if the tire rotates in either direction the system will inflate the tire cavity.

However, the bi-directional feature is optional. The system may also work for a one directional system, a check valve from each check valve module i.e., check valves 157 and 158 can be eliminated.

The advantages of the subject invention is that the control valve retains the ability to manually fill air into the tire with the use of a standard external pump, while the control valve directs the pressurized air to pump the tire cavity during operation of the system. The control valve has a compact housing that can be installed onto a tire valve stem for pumping air from the pump into the tire cavity through the valve stem. The control valve prevents the tire cavity from being over pressurized with either the manual fill or via the peristaltic pump. The set pressure is easily adjusted by screw adjustment to the control regulator 68 without dismounting the tire. The filter and the control valve in its entirety may be easily replaced if needed.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A control valve for controlling the pressure of a tire cavity during operation of a pump having a pump inlet and a pump outlet, said tire having a tire cavity and a valve stem having a distal end, the control valve comprising:
    a valve body having a pump inlet chamber, a pump outlet chamber, and a control chamber, wherein a first check valve module is positioned in the pump inlet chamber, said first check valve module having a first flow path and a first check valve mounted therein;
    said valve body further comprising a second check valve module positioned in the pump outlet chamber, said second check valve module having a second flow path and a second check valve mounted therein;
    said valve body further comprising a relief valve positioned in the control chamber, said relief valve having an inlet end in fluid communication with a main pressure chamber and an outlet end in fluid communication with the atmosphere; and
    wherein the main pressure chamber is in fluid communication with the pump inlet chamber and the pump outlet chamber, and the distal end of the tire valve stem.

2. The control valve of claim 1 wherein the pump inlet port and pump outlet port are connectable to the pump inlet, pump outlet, respectively.

3. The control valve of claim 1 wherein the valve body is shaped like a cup.

4. The control valve of claim 1 wherein a cap is received over a first end of the valve body.

5. The control valve of claim 1 wherein the valve body further comprises a cap having detents which latch with an outer rim of the valve body forming a snap fit.

6. The control valve of claim 1 wherein the valve body is injection molded.

7. The control valve of claim 1 wherein the pump inlet chamber has a third check valve positioned between the pump inlet port and the main pressure chamber.

8. The control valve of claim 7 wherein the pump outlet chamber has a fourth check valve positioned between the pump outlet port and an ambient air inlet passageway.

9. The control valve of claim 1 wherein the main pressure chamber is in fluid communication with a manual fill assembly disposed at an outer end of the valve body.

10. The control valve of claim 1 having an internal passageway in fluid communication with the main pressure chamber, wherein the internal passageway is configured for mounting on the distal end of the tire valve stem.

11. A control valve for controlling the pressure of a tire cavity during operation of a pump, said tire having a tire cavity and a valve stem having a distal end, the control valve comprising:
a valve body having a pump inlet port, a pump outlet port, and a main pressure chamber;
wherein a first check valve is positioned between an ambient air inlet passageway and the pump inlet port;
wherein a second check valve is positioned between a pump outlet port and the main pressure chamber, said valve body further comprising a relief valve having an inlet end in fluid communication with the main pressure chamber and an outlet end in fluid communication with the atmosphere;
wherein the main pressure chamber is in fluid communication with the pump inlet port, the pump outlet port, and the tire valve stem; and
whereby compressed air from the pump outlet port is communicated to the main pressure chamber, and if the pressure of the compressed air exceeds the cracking pressure of the tire valve stem, the tire cavity is inflated until the pressure of the main pressure chamber exceeds the set pressure of the relief valve.

12. The control valve of claim 11 wherein the valve body has an inlet hole for mounting to the distal end of the tire valve stem so that fluid from the main pressure chamber is communicable to the tire valve stem.

13. An air maintenance tire assembly comprising:
a tire having a tire cavity, said tire having a valve stem projecting outward from the tire cavity, said valve stem having an internal valve stem air passageway in communication with the tire cavity operative to direct pressurized air from the valve stem air passageway into the cavity;
a pump tube having an inlet end and an outlet end and being configured for pumping pressurized air into the tire cavity;
a control valve comprising a valve body having a pump inlet port, a pump outlet port, and a main pressure chamber;
wherein a first check valve is positioned between an ambient air inlet passageway and the pump inlet port, and a second check valve is positioned between a pump outlet port and the main pressure chamber, said valve body further comprising a relief valve having an inlet end in fluid communication with the main pressure chamber and an outlet end in fluid communication with the atmosphere;
wherein the main pressure chamber is in fluid communication with the pump inlet port, the pump outlet port, and the tire valve stem; and
wherein compressed air from the pump outlet port is communicated to the main pressure chamber of the valve device, and if the pressure of the compressed air exceeds the cracking pressure of the tire valve stem, the tire cavity is inflated until the pressure of the main pressure chamber exceeds the set pressure of the relief valve.

14. The air maintenance tire assembly of claim 13 wherein the pump inlet chamber has a third check valve positioned between the pump inlet port and the main pressure chamber.

15. The air maintenance tire assembly of claim 14 wherein the pump outlet chamber has a fourth check valve positioned between the pump outlet port and an ambient air inlet passageway.

16. The air maintenance tire assembly of claim 13 wherein the assembly is bidirectional.

17. The air maintenance tire assembly of claim 13, wherein the relief valve is operable to vent pressurized air when an air pressure within the tire cavity is at or above a predetermined optimal inflation level, and the relief valve is operable to close when air pressure within the tire cavity is below the predetermined optimal inflation level.

18. An air maintenance tire assembly comprising:
a tire having a tire cavity, said tire having a valve stem projecting outward from the tire cavity, said valve stem having an internal valve stem air passageway in communication with the tire cavity operative to direct pressurized air from the valve stem air passageway into the cavity;
a pump tube having an inlet end and an outlet end and being configured for pumping pressurized air into the tire cavity;
a control valve having a valve body having a pump inlet chamber, a pump outlet chamber, and a control chamber, wherein a first check valve is positioned in the pump inlet chamber so that the first check valve is located between an ambient air inlet passageway and a pump inlet port, said valve body further comprising a second check valve positioned in the pump outlet chamber, said second check valve being positioned between a pump outlet port and a main pressure chamber, said valve body further comprising a relief valve positioned in the control chamber, said relief valve having an inlet end in fluid communication with a main pressure chamber and an outlet end in fluid communication with the atmosphere; and
wherein the main pressure chamber is in fluid communication with the pump inlet chamber and the pump outlet chamber, and the distal end of the tire valve stem.

19. The air maintenance tire assembly of claim 18 wherein the pump inlet chamber has a third check valve positioned between the pump inlet port and the main pressure chamber.

20. The air maintenance tire assembly of claim 19 wherein the pump outlet chamber has a fourth check valve positioned between the pump outlet port and an ambient air inlet passageway.

21. The air maintenance tire assembly of claim 18 wherein the main pressure chamber is in fluid communication with a manual fill assembly disposed at an outer end of the valve body.

22. The air maintenance tire assembly of claim 18 wherein the valve body has an internal passageway in fluid communication with the main pressure chamber, wherein the internal passageway is configured for mounting on the distal end of the tire valve stem.

* * * * *